March 31, 1959 E. E. MOSS Re. 24,624

COTTON LINT CLEANERS

Original Filed Aug. 9, 1951 3 Sheets-Sheet 1

Ennis E. Moss
INVENTOR

BY Ashley & Ashley
ATTORNEYS

COTTON LINT CLEANERS

Original Filed Aug. 9, 1951 3 Sheets-Sheet 2

Ennis E. Moss
INVENTOR

BY Ashley & Ashley
ATTORNEYS

COTTON LINT CLEANERS

Original Filed Aug. 9, 1951 3 Sheets-Sheet 3

Ennis E. Moss
INVENTOR

BY Ashley & Ashley
ATTORNEYS

United States Patent Office

Re. 24,624
Reissued Mar. 31, 1959

24,624

COTTON LINT CLEANERS

Ennis E. Moss, Lubbock, Tex., assignor, by mesne assignments, to George Garrison Potts, trustee, Dallas, Tex.

Original No. 2,704,862, dated March 29, 1955, Serial No. 241,053, August 9, 1951. Application for reissue July 7, 1958, Serial No. 755,819

15 Claims. (Cl. 19—67)

Matter enclosed in heavy brackets [ ] appears in the original patent but forms no part of this reissue specification; matter printed in italics indicates the additions made by reissue.

This invention relates to new and useful improvements in cotton lint cleaners.

The general object of the invention is to provide a cotton lint cleaner of the dual type of a capacity to handle the output of a battery of gins, connected to the lint flue at a point between said gins and the common condenser to which the lint flue normally delivers the lint cotton prior to pressing, and having valve controls by which the lint cotton may be conducted to said condenser by alternate paths, one in the case of the cotton which requires no further cleaning, directly through the lint flue by-passing said cleaner, and the other through said cleaner and then through the lint flue to the condenser.

A further object of the invention is to provide an [improvide] *improved* cotton lint cleaner wherein the lint is spread in wide thin bats and combed out so as to free it from foreign matter.

Still another object of the invention is to provide an improved cotton lint cleaner having means for spreading and straightening out the fibers on the saw cylinders, whereby the cotton is more thoroughly cleaned and foreign matter is more readily thrown out.

Another object of the invention is to provide an improved cotton lint cleaner wherein the lint is delivered in a thin bat through drawing rolls that hold the bat firmly and feed lint to saws in a thin uniform bat at a constant rate of speed so that saws may comb the fringe of lint thus presented evenly over cleaning bars.

A further object of the invention is to provide an improved cleaner, of the character described, wherein the lint is fed to the saw teeth by means of a feeding roll and a feed bar so constructed and arranged that pressure is applied in such a manner as to hold the lint in contact with the saw teeth, thus enabling the saw teeth to provide a combing and straightening action on the fringes of the strands of lint fibers which tends to free the fibers from all foreign matter, such as motes, dirt and shale.

Another object of the invention is to provide an improved cleaner, of the character described, wherein the cotton is fed to and held on the saw teeth in such a manner as to prevent the teeth from plucking large tufts out of the bat as well as permitting the feed to load the saw teeth in a uniform and orderly manner, thus avoiding overloading the saws with large tufts of cotton which would be stripped off by the cleaning bars and substantially eliminating loss of lint.

An important object of the invention is to provide an improved lint cleaner in which the lint is held until just before it is picked up by the cleaning saws whereby the lint is spread more uniformly over the saws.

A construction designed to carry out the invention will be hereinafter described together with other features of the invention.

The invention will be more readily understood from a reading of the following specification and by reference to the accompanying drawings, wherein examples of the invention are shown, and wherein:

Fig. 1 is a transverse, vertical, sectional view of a lint cleaner constructed in accordance with the invention, Fig. 2 is an end elevational view, partly in section, of the cleaner, Fig. 3 is an enlarged, horizontal, cross-sectional view, taken on the line 3—3 of Fig. 2, Fig. 4 is a partial, horizontal, cross-sectional view of the auxiliary air-supply manifold and discharge head, taken on the line 4—4 of Fig. 1.

Figure 1:
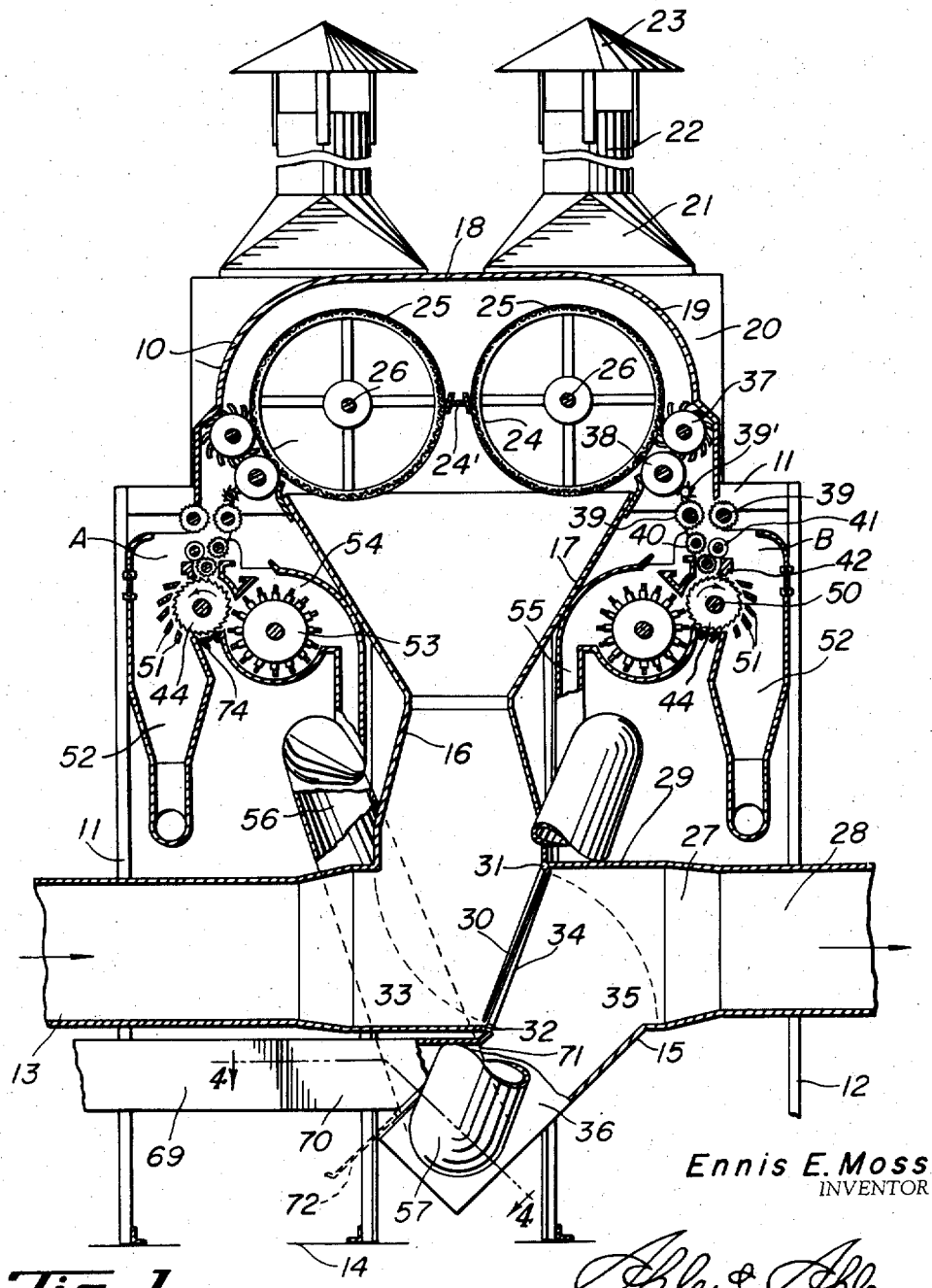

This application is a continuation-in-part of my copending application filed September 29, 1950, Serial No. 187,381, now abandoned.

In the drawings, the numeral 10 designates generally a casing or housing supported on a horizontal, rectangular frame 11 mounted on the upper ends of legs or standards 12. The housing 10 is at a sufficient elevation to permit a lint flue 13 to be suspended thereunder above the gin floor 14. The flue 13 leads to a valve box 15 which has an upright transition 16 extending from its upper and connected with the lower end of an upwardly-flaring distributor 17, suspended from the bottom of the housing 10. A flat roof 18, having downwardly curved ends 19, is provided at the top of the housing. The sides of the housing are enclosed by upright flue boxes 20 which extend forwardly and rearwardly of the housing ends 19. Each box 20 is quite narrow and has transitions 21 in its top at its forward and rear ends, which transitions are connected to stacks 22 having cowls 23 thereon.

Transverse, revolving screen cylinders 24, open at their ends, are mounted one in front of the other across the housing in circular openings 25 in the inner walls of the flue boxes, [wehreby] *whereby* air is discharged from the ends of the screen cylinders into said boxes. Inclined, longitudinal strippers 24' are disposed between the screen cylinders 24 to strip off cotton lint clinging thereto due to static electricity. The screen cylinders are fastened on shafts 26 which are suitably journaled in the outer walls of the flue boxes. Cotton lint is delivered by the flue 13 into the valve box 15 which has an outlet 27 connected with a discharge flue 28. At the intersection of the rear side of the transition 16 and top wall 29 of the flue 28, a deflecting damper 30 depends from a transverse rod 31 and has suitable operating means (not shown) whereby the damper may be swung upwardly to a horizontal position to close off the entrance to the transition 16. When open, the damper 30 has its lower end abutting a transverse rod 32 at the end of the bottom wall 33 of the valve box 15. A transverse, shut-off damper 34 extends from the rod 32 to the top wall 29 and has its upper edge abutting the rod 31. The rod 32 is at the forward edge of an inlet opening 35 in the bottom wall 33 of the valve box and is forward of the shaft 31, whereby the dampers, when open, are disposed at an angle and shut off flow from the flue 13 through the valve box to the discharge flue 28. The opening 35 is at the upper end of a common discharge head 36.

Since the lint doffed from each screen cylinder 24 is carried through the same instrumentalities, at the front and rear of the cleaner, duplicate numerals for like parts will be employed and a description of one group will suffice for both groups. The rear or right-hand group has been chosen. The front group in Fig. 1 is designated by the letter A and the rear group by the letter B.

Figure 5:
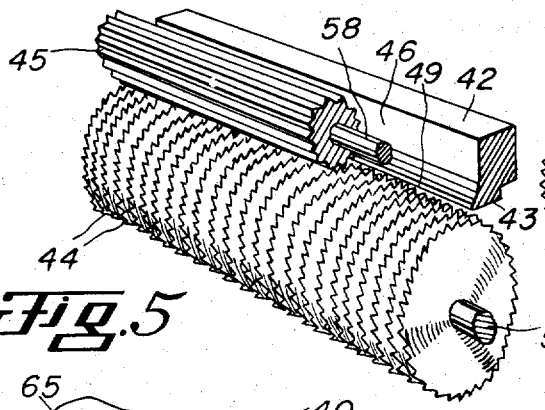
Fig. 5 is a fragmentary, perspective view of the feeding roll and feed bar mechanism.
Figure 6:
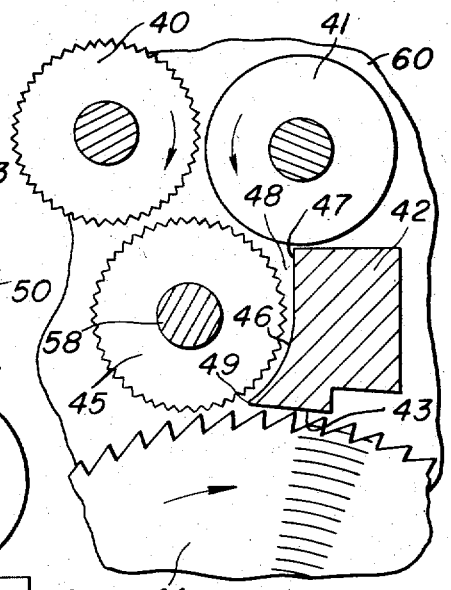
Fig. 6 is an enlarged, transverse, vertical, sectional view of the mechanism.

The rear screen cylinder 24 is revolved in a counter-clockwise direction (Fig. 1). A doffing roll 37, mounted transversely in the housing, has its flexible blades wiping down the surface of the cylinder, relatively below the shaft 26 thereof. The blades deposit the removed lint in the form of a continuous bat upon the surface of a smooth-surfaced discharge roll 38 mounted immediately below and between the roll 37 and cylinder. A pair of fluted feed rolls 39 are mounted in parallel relation below and rearwardly of the discharge roll 38 and a stripper roll 39' is interposed, in wiping relation, between said discharge roll and the innermost roll 39. Immediately under the rolls 39 and parallel thereto, a pair of pressure rolls 40 and 41 are mounted and are of less diameter than said rolls 39. The right-hand or outer roll 41 is smooth surfaced, while the rolls 39 and 40 are toothed or fluted longitudinally. It is to be noted that the bat, carried downwardly between the rolls 37 and 38, is successively flattened or compressed into a thinner web as it passes successively between the rolls 39 and then between the rolls 40 and 41. Immediately below the roll 41 and extending longitudinally thereof is a bat end supporting bar 42 (Figs. 1, 5 and 6) which is made of steel or other suitable material and which is of major importance and contributes largely to the success of the machine.

The supporting bar 42 has a flat, lower offset surface 43, inclined slightly downwardly and outwardly in close proximity to the teeth of an underlying saw cylinder 44 which revolves in a clockwise or outward direction. Immediately under and between the rolls 40 and 41 and in juxtaposition to the bar 42 is a fluted feed roll 45. The bar 42 has an inner curved face 46 conforming to the lower periphery of the feed roll 45 and merging into an upright breast 47 above the center of said roll. Since the lower, inner side of the roll 41 is close to the upper edge of the breast 47 and roll 45, a triangular pocket 48 (Fig. 6) is formed therebetween and the bat is fed thereinto. The feed roll 45 is adjustable toward and from the bar 42, as will be hereinafter described, and the bat, delivered to the pocket 48, is compressed into a thin bat between said roll and the curved face 46.

A transversely, rounded nose 49 is provided at the juncture of the curved face and the lower surface 43 of the bar and extends between the lower, inner periphery of the roll 45 and the teeth of the saw cylinder 44. This nose is quite important in properly feeding the lint to the saw teeth. The saw cylinder 44 is mounted on a shaft 50 and spaced, longitudinal cleaning bars 51 are disposed in close proximity to its outer peripheral portion to doff foreign matter from the lint carried by the saw teeth. The bars 51 form a longitudinal grill at the upper end of an upright, transverse dust leg 52 into which fine trash and dust are cast and from the lower end of which such trash and dust are removed in any suitable manner. A revolving brush 53 of the usual type is mounted at the lower, inner side of the saw cylinder to wipe the lint from its teeth. The brush revolves in a flue head 54 from the left-hand or front side of which a vertical discharge flue 55 depends. The lower end of the flue 55 discharges into the upper end of an inclined tubular conductor 56 which extends downwardly on one side of the valve box 15 and has its lower end connected to the discharge head 36 by an elbow 57.

Figure 7:
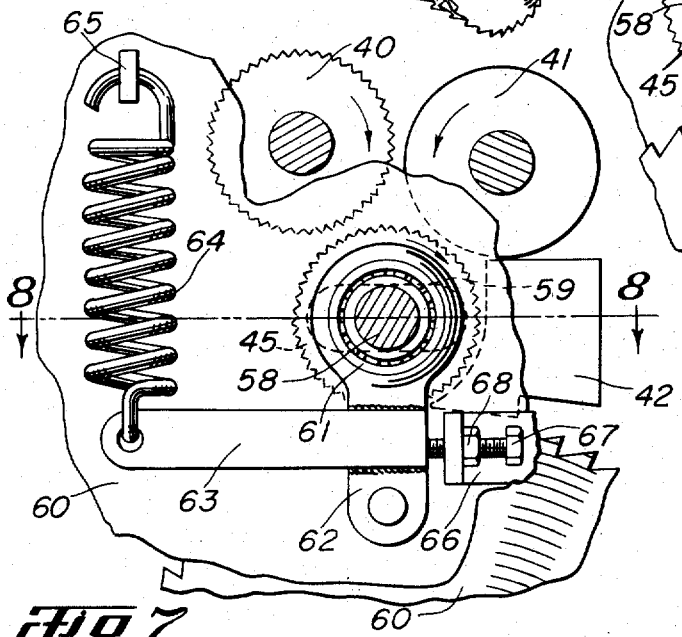
Fig. 7 is an enlarged, detailed view of the roll adjusting means.
Figure 8:
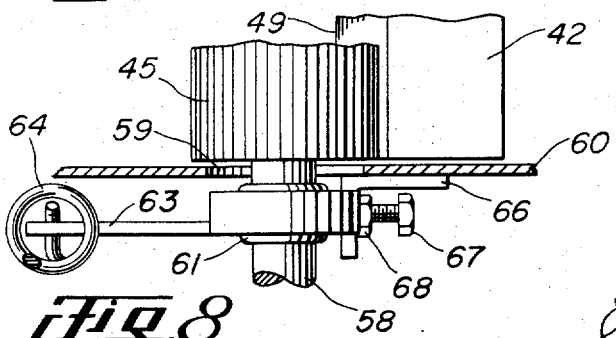
Fig. 8 is a partial, transverse, vertical, sectional view taken on the line 8—8 of Fig. 7.

It is noted that the faces 43, 46 and 47 of the supporting bar 42 are smooth and that the nose 49 is also smooth and rounded so as not to damage the lint as it is fed to the saws. As set forth hereinbefore, the feed roll 45 is adjustable so as to be under tension for exerting the proper pressure on the cotton bat to feed it to the saw cylinder 44 in the most efficient manner. As shown in Figs. 7 and 8, the feed roll 45 is carried by a shaft

58 which is laterally adjustable in horizontal slots 59 formed in the side walls 60 of the housing. Each end of the shaft 58 is mounted in a ball bearing unit 61 carried by an upright arm 62 which is pivoted at its lower end to the outer face of the adjacent wall 60. A horizontal tension bar 63 has its inner end fastened to the arm 62 above its pivot and at its outer end is connected to the lower end of a coil spring 64 which is hooked at its upper end into an eye 65 on the wall 60. Since the spring 64 exerts an upward pull on the bar 63, the arm is swung to move the roll 45 toward the bar 42. A bracket 66 on the wall 60 carries a headed bolt 66 screw-threaded therethrough and bearing against the arm 61 at the end of the bar 63. A jamb nut 68 on the bolt engages the bracket and fastens the bolt in adjusted positions. Thus, the space between the ribs of the roll 45 and the face 46, and consequently the thickness of the bat, may be minutely controlled.

The rolls 37, 38, 39, 39', 40 and 41, the shaft 50, the brush 53 and the shafts 26 are suitably mounted in the end walls 60 and may be driven in any suitable manner, as is common in this art. In the event that the lint cotton produced by the battery of gins is sufficiently clean to be passed direct to the conventional condenser at the end of the lint flue, the subject lint cotton cleaner is cut out from the system by swinging the damper 30 upwardly to close off the transition 16 and the damper 34 downwardly, to close the opening 35 of the header 36.

In operation, the lint cotton cleaner is connected to the lint discharge flue from the cotton gins whereby the airborne lint is discharged into the flue 13. It has been found that by use of this lint cleaner it is possible to handle all of the lint from a battery of gin stands. The lint conducted to [the] the flue 13 is deflected by the damper 30 into the transition 16, from which it is discharged into the bottom of the distributor 17 where it is spread and carried upwardly to the two revolving screen cylinders 24. The air is drawn through the foraminous coverings of the cylinders and discharged from the ends of said cylinders into the flue boxes 20 (Figs. 2 and 3) from which it escapes by way of the transitions 21 and stacks 22.

The lint is drawn against the lower portions of the cylinders 24, the front cylinder (left Fig. 1) revolving in a clockwise direction and the rear cylinder revolving in a counter-clockwise direction whereby said lint is carried outwardly and upwardly to the rolls 37 and 38. The rolls 37 act to strip the lint from the screen surfaces and to transfer it to the rolls 38, in the form of a bat from which it is stripped off by the wiper rolls 39'. The rolls 37 and 38 act to further bat the lint and the bats are carried down between the fluted rolls 39 which partially compress said bats. From the rolls 39, the bat is carried down between the rolls 40 and 41 and further compressed therebetween. The bats are directed into the pockets 48 and fed down between the faces 46 of the feed bars 42 and the feed rolls 45. It will be observed that the rolls 45 revolve inwardly from the lower ends of the faces 46 and the noses 49, and since the saw cylinder 44 revolves outwardly, the lint is drawn sharply under said noses 49 and spread or strung outwardly on the upper portion of said saw cylinder against the smooth polished lower surfaces 43 of the bars 42. This is an important feature, because a long fringe of cotton is presented to the saw teeth which gives a much better opportunity for combining and removing motes, trash, and other foreign material.

The advantages of the supporting bars 42 are many. The adjustment of the feed rolls 45 assures the right tension on thick or thin bats of cotton lint to ensure sufficient pressure at all times and thereby avoid plucking large tufts of cotton lint so that the fibers are carried to the saw cylinders in a properly spread manner. The functions and advantages of the feed bar arrangement are: first, to feed the bat at a predetermined constant rate of speed; second, to open the strands of lint; third, to straighten the fibers; fourth, to clean the lint; and fifth, to carry the lint as a thin uniform sheet to the saw cylinders. Since the fringe of lint is held by the rolls 45 and the supporting bars, it will be disentangled as the teeth pass through it. It is noted that the lower surface 43 of each supporting bar is preferably of increased width when cleaning long staple lint.

When the lint is released from the "bite" of the supporting bar, it is taken by the teeth of the saw cylinders and foreign matter is loosened from the fibers and thrown off as it passes out from under the lower surfaces 43 and any foreign matter left in said lint is knocked off by the cleaning bars 51. By this arrangement, the lint is fed onto the saw cylinders in a smooth even manner and substantially no lint is thrown off as it passes the cleaning bars. Every tooth of the cylinder saws is equally loaded which makes it possible for this cleaner to have a maximum capacity.

Figure 2:
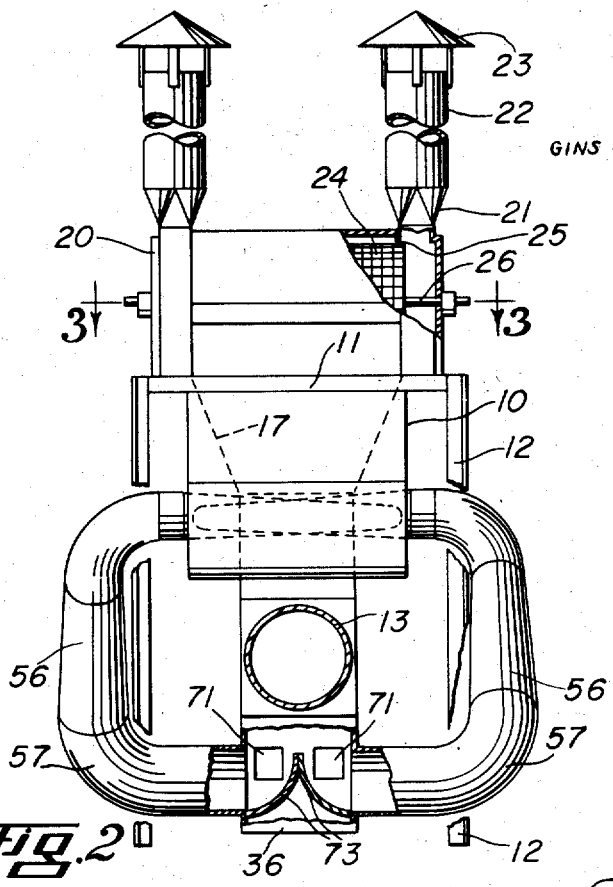
Figure 9:
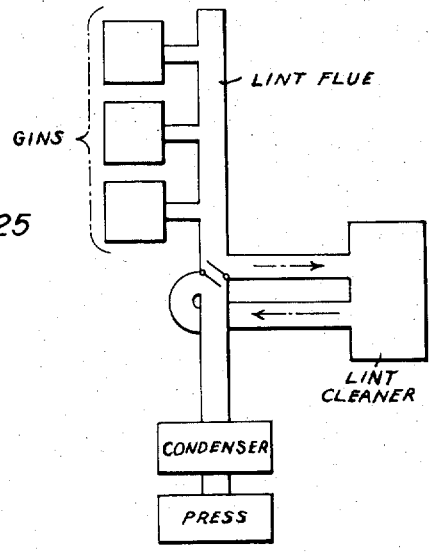
Figure 9 is a diagrammatic view indicating the position of the subject lint cleaner with respect to the lint flue in the conventional system for handling lint cotton.
Figure 3:
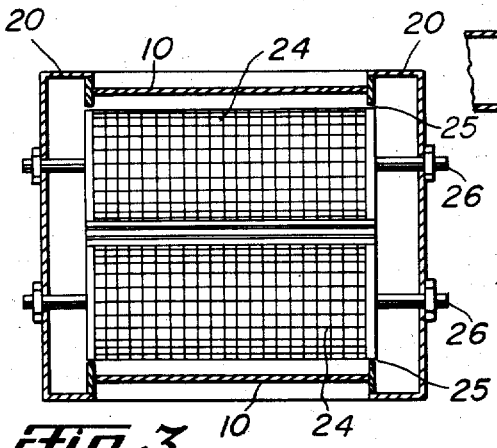
Figure 4:
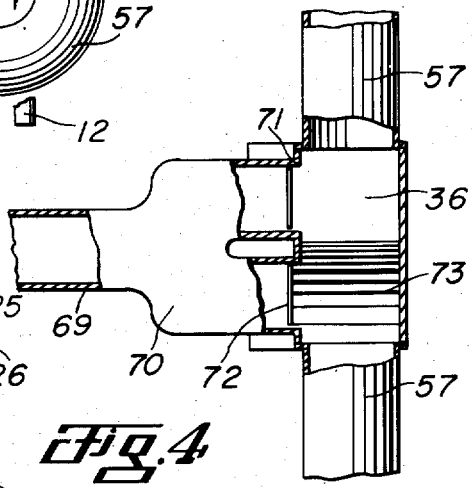

It is to be understood that the flue 28 leads to a suitable condenser [(not shown)], *shown in Figure 9*. When the damper 30 is swung up to close off the entrance to the transition 16, and the damper 34 is swung down to close off the inlet opening 35 of the head 36, lint is conducted straight from the flue 13 through the valve box 15 into the flue 28. It has been found that additional air currents may be desirable to carry the cotton from the head 36 when it is delivered thereto by the conductors 56. For this purpose, an air-supply flue 69 may underlie the flue 13 and has a manifold 70 communicating with the upper portion of the head 36 through openings 71 (Figs. 1, 2 and 4). The discharge of air into the head is controlled by slide valves 72. As is best shown in Fig. 2, an upright spreader 73 is mounted in the bottom of the head 36 and curves upwardly to a point between the openings 71 and in front of the elbows 57, whereby the lint is deflected upwardly in said head.

It is noted that between each brush 53 and the adjacent saw cylinder 44, the flue head 54 is spaced longitudinally from the inner wall of the dust leg 52 and spaced longitudinal bars 74, which may be adjustable, are disposed. These bars permit the admittance of an updraft of air to aid the blowing of dust into the leg 52 and have the additional function of wiping cotton back onto the saw cylinder 44. Above each brush, the flue head is open to admit air. The cotton passes between the rolls 39 at a suitable rate of speed and is formed into a bat which is carried downward. This bat is successively reduced in thickness as it passes down to the saw cylinder and the speed is increased so as to draw out the bat and prevent folding or lapping thereof.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A system for cleaning the aggregate lint cotton put out by a battery of gins, said system including a battery of gins, a condenser serving said gins and a common lint flue for conducting the lint cottom discharged from said gins to said condenser, means for withdrawing the aggregate cotton from said common lint flue, cleaning it and returning it to said common lint flue, said means comprising a by-pass conduit having dirty cotton and clean cotton limbs communicating with said common lint flue at points between said gins and condenser, a cleaner in said by-pass conduit comprising, within said dirty cotton limb, means for drawing the aggregate cotton into said cleaner, means for separating the vehicle air from said cotton and means for cleaning said cotton, said clean cotton limb having a mouth open to atmosphere at a distance from said cotton cleaning means, means for transferring cleaned cotton without vehicle air from said cotton cleaning means to the mouth of said clean cotton limb, means for providing a column of clean vehicle air for carrying said cleaned cotton to said condenser, at least part of which column is induced through said clean cotton limb, and valve means for closing the passage through said common lint flue at a point between the ends of said by-pass conduit.

2. A system for cleaning the aggregate lint cotton put out by a battery of gins, said system including a battery of gins, a condenser serving said gins, and a common lint flue for conducting the lint cotton discharged from said gins to said condenser, means for withdrawing the aggregate cotton from said common lint flue, cleaning it and returning it to said common lint flue, said means comprising a by-pass conduit having dirty cotton and clean cotton limbs communicating with said common lint flue at points between said gins and condenser, a cleaner in said by-pass conduit comprising, within said dirty cotton limb, means for drawing the aggregate cotton and vehicle air from said common lint flue into said dirty cotton limb, a perforate baffle across said dirty cotton limb against which the cotton impinges and forms a bat, being separated from the vehicle air, which passes through said baffle, cleaning means, and means for transferring the batted cotton without vehicle air to said cleaning means, valve means for closing the passage through said common lint flue at a point between the ends of said by-pass, and means providing a column of clean vehicle air for carrying said cleaned cotton to said condenser.

3. In a system for handling lint cotton, of the class wherein a battery of gins discharges the lint cotton into a common lint flue, the lint flue delivering said cotton to a condenser from which it proceeds to a press, in such system, a lint cleaner for cleaning the common product of said battery of gins, when required, prior to its delivery to said condenser, said lint cleaner comprising a substantially horizontal conduit adapted to be intercalated in said lint flue between said battery of gins and said condenser to form a part of said lint flue, valve means across said conduit dividing it into anterior and posterior portions, an upwardly extending duct having its lower end communicating with said anterior portion adjacent said valve means, rotatable foraminous condensing means overlying the upper end of said duct, the latter being open to atmosphere through said condensing means, cotton cleaning means laterally of and outside of said duct including a saw cylinder and a series of rollers between said condensing means and saw cylinder, including a doffer for removing lint cotton from said condensing means in the form of a continuous bat, and rolls receiving said bat from said doffer, so constructed and so driven as to draw the bat thinner, compress it and feed it progressively to the saw cylinder, a bat end supporting bar extending longitudinally of said saw cylinder positioned at the leading side of the line of presentation of said bat to the saw cylinder, having a face thereof confronting the periphery of said saw cylinder slightly spaced therefrom, for supporting the bat end while being combed by the saw teeth, and causing the lint to become fastened to the saw teeth, a series of spaced cleaning bars positioned in a leading direction beyond said bat end supporting bar, arranged in the path of the centrifugally extended lint fibers carried by the teeth of said saw cylinder, a doffer in operative proximity to the side of said saw cylinder opposite said cleaning bars, a duct surrounding said doffer open to atmosphere adjacent said doffer and communicating with said posterior portion of said conduit adjacent said valve means, the latter being alternatively operable to close said ducts and place the anterior and posterior portions of said conduit in communication, excluding said lint cleaner, or to close communication between said anterior and posterior portions, and establish communication between said ducts and said lint flue, thereby diverting the flow of cotton through said lint cleaner, and means for introducing a flow of air into the said posterior portion to entrain a flow of clean vehicle air through said duct, for the cleaned cotton.

4. In a system for handling lint cotton, of the class wherein a battery of gins discharge the lint cotton into a common lint flue, the lint flue delivering said cotton to a condenser from which it proceeds to a press, in such system, a lint cotton cleaner for cleaning the common product of said battery of gins, when required, prior to its delivery to said condenser, said lint cleaner comprising a substantially horizontal conduit adapted to be intercalated in said lint flue between said battery of gins and said condenser, forming part of said lint flue, valve means across said conduit dividing it into anterior and posterior portions, an upwardly extending inlet duct having its lower end communicating with said anterior portion adjacent said valve means, a pair of foraminous condenser cylinders overlying the upper end of said inlet duct having their lower halves exposed to said duct and driven to rotate away from one another, said duct being open to atmosphere through said condensing cylinders, a sequence of doffing and cleaning instrumentalities individual to said cylinders, a header communicating with the posterior portion of said conduit adajcent said valve means, ducts for the return of cleaned lint individual to said sequences of instrumentalities, open to atmosphere and communicating with said header, said valve means being alternatively operable to cut off communication of said inlet duct and header with said conduit, and placing the anterior and posterior portions thereof in communication, or to cut off communication between said anterior and posterior portions and establish communication of said inlet duct and header with said lint flue, thereby diverting the flow of cotton through said lint cleaner, and means for introducing a flow of air to said posterior portion to entrain a flow of clean vehicle air through said ducts for the cleaned cotton.

5. System for handling cotton as claimed in claim 4, including an adjustable atmospheric air inlet in said header.

6. System for handling cotton as claimed in claim 4, said return ducts opening into said header from opposite sides, there being independent adjustable atmospheric air inlets in said headers, one adjacent each return duct.

7. Lint cotton cleaner comprising a housing the opposite ends of which are spaced walled chambers evacuated to atmosphere, a pair of foraminous revolving condensing cylinders mounted across said housing on parallel axes in a substantially horizontal plane, with their ends in communication with said chambers through registering apertures in the inner walls thereof, said cylinders being driven in such direction that they rotate away from one another in their lower arcs, a lint flue extending substantially horizontally beneath said housing at a distance therefrom, having valve means extending thereacross dividing said lint flue into an anterior lint cotton receiving portion and a posterior portion adapted to deliver the lint cotton to a condenser, a duct extending upward from said anterior portion at a point adjacent said valve means, having its upper part flared and its upper mouth in close relation to said cylinders for discharging lint cotton distributively against said cylinders in their lower arcs, similar cleaning units for each cylinder outside said duct, each comprising a saw cylinder at lower level than the corresponding condensing cylinder, means for doffing lint from said condensing cylinder, forming it into a continuous thin bat and presenting the bat substantially endwise to the upper part of said saw cylinder, the element of said cleaning unit immediately anterior to said saw cylinder being a fluted feeding roll, a bat end supporting bar arranged longitudinally of said saw cylinder and laterally of said feed roll on that side from which the teeth of said saw cylinder retreat, said bar having a concave face substantially coaxial with said feed roll against which said bat is supported while being fed by said feed roll, and having a lower face extending circumferentially over said saw cylinder and close thereto for a linear extent equal to the length of several teeth having a rounded nose between said concave and lower faces whereby the end of the bat is turned about said nose and combed and fringed by said saw teeth and attached thereto while pressed supportingly by said saw teeth against said lower face, a series of cleaning bars arranged arcuately about said saw cylinder beyond said supporting bar, in the direction of rotation of said saw cylinder, a doffer on the opposite side of said saw cylinder from said cleaning bars, a header communicating with the posterior portion of said lint flue at a point adjacent said valve means, and ducts for the cleaned lint in operative relation to said last named doffers opening into said header, said valve means being operable to control the ducts which communicate with said lint flue, and the through passage between said anterior and posterior portions of said lint flue.

8. Lint cotton cleaner as claimed in claim 7, said valve means comprising two flap valves, one pivoted at the top of said lint flue, controlling the adjacent upwardly extending duct, the other pivoted at the bottom of said lint duct, controlling said headers, both lying substantially parallel when closing the through passage between the anterior and posterior portions of said lint flue.

9. Lint cotton cleaner as claimed in claim 7, said supporting bars each being rabbeted beyond the trailing end of said lower face providing an offset face against which the cotton fibers carried by said saw teeth whip under the urge of centrifugal force when released from the space between said lower face and the saw cylinder.

10. As a sub-combination in a cotton lint cleaner, an elongate supporting bar having a curved lateral face and a flat lower face with a rounded nose along the intersection of said faces, a feed roll in juxtaposition to said curved face, a saw cylinder having its teeth passing in justaposition to said lower face, a swingable bracket in which said feed roll is journaled, a spring connected to said bracket urging said feed roll toward said curved face, and an adjustable stop for determining the minimum spacing between said feed roll and said curved face.

*11. A system for cleaning the aggregate lint cotton put out by a battery of gins, said system including a battery of gins, a condenser serving said gins, and a common lint flue for conducting the lint cotton discharged from said gins to said condenser, means for withdrawing the aggregate cotton from said common lint flue, cleaning it and returning it to said common lint flue, said means comprising a by-pass conduit having dirty cotton and clean cotton limbs communicating with said common lint flue at points between said gins and condenser, a cleaner in said by-pass conduit comprising, within said dirty cotton limb, means for drawing the aggregate cotton and vehicle air from said common lint flue into said dirty cotton limb, a perforate baffle across said dirty cotton limb against which the cotton impinges and forms a bat, being separated from the vehicle air, which passes through said baffle, cleaning means including a rotary saw cylinder and a bat end supporting bar extending longitudinally of said saw cylinder and having a concavely curved lateral face and a flat lower face juxtaposed to the saw cylinder and a feed roll juxtaposed to said curved face defining a bat passage therebetween, said bat end supporting bar and feed roll coacting to compress the bat therebetween and support the bat end while said bat end is being combed by the saw teeth and cause the lint to become fastened to the saw teeth, and means for transferring the batted cotton without vehicle air to said cleaning means, valve means for closing the passage through said common lint flue at a point between the ends of said by-pass, and means providing a column of clean vehicle air for carrying said cleaned cotton to said condenser.*

*12. A system for cleaning the aggregate lint cotton put out by a battery of gins, said system including a battery of gins, a condenser serving said gins, and a common lint flue for conducting the lint cotton discharged from said* gins to said condenser, means for withdrawing the aggregate cotton from said common lint flue, cleaning it and returning it to said common lint flue, said means comprising a by-pass conduit having dirty cotton and clean cotton limbs communicating with said common lint flue at points between said gins and condenser, a cleaner in said by-pass conduit comprising, within said dirty cotton limb, means for drawing the aggregate cotton and vehicle air from said common lint flue into said dirty cotton limb, a perforate baffle across said dirty cotton limb against which the cotton impinges and forms a bat, being separated from the vehicle air, which passes through said baffle, cleaning means including a rotary saw cylinder, a feed roll, a bat end supporting bar arranged longitudinally of said saw cylinder having a concave face substantially coaxial with said feed roll against which said bat is supported while being fed to said feed roll and a lower face extending circumferentially over said saw cylinder and close thereto for a lineal extent equal at least to the length of several teeth and having a rounded nose between said concave and lower faces, and means resiliently biasing said feed roll toward said concave face of said bat end supporting bar to compress the bat therebetween, said bat end supporting bar and feed roll coacting to support the bat end while said bat end is turned about said nose and combed and fringed by said saw teeth and cause the lint to become fastened to the saw teeth, and means for transferring the batted cotton without vehicle air to said cleaning means, valve means for closing the passage through said common lint flue at a point between the ends of said by-pass, and means providing a column of clean vehicle air for carrying said cleaned cotton to said condenser.

13. A system for cleaning the aggregate lint cotton put out by a battery of gins, said system including a battery of gins, a condenser serving said gins, and a common lint flue for conducting the lint cotton discharged from said gins to said condenser, means for withdrawing the aggregate cotton from said common lint flue, cleaning it and returning it to said common lint flue, said means comprising a by-pass conduit having dirty cotton and clean cotton limbs communicating with said common lint flue at points between said gins and condenser, a cleaner in said by-pass conduit comprising, within said dirty cotton limb, means for drawing the aggregate cotton and vehicle air from said common lint flue into said dirty cotton limb, a perforate baffle across said dirty cotton limb against which the cotton impinges and forms a bat, being separated from the vehicle air, which passes through said baffle, cleaning means including a rotary saw cylinder, a bat end supporting bar extending longitudinally of said saw cylinder and having a curved lateral face and a flat lower face juxtaposed to the saw cylinder and a feed roll juxtaposed to said curved face in substantially concentric relation therewith defining a bat passage therebetween, said bat end supporting bar and feed roll coacting to compress the bat therebetween and support the bat end while said bat end is being combed by the saw teeth and cause the lint to become fastened to the saw teeth, and means for transferring the batted cotton without vehicle air from said baffle to said cleaning means including a doffer for removing lint cotton from said baffle in the form of a continuous bat and rolls receiving said bat from said doffer, so constructed and so driven as to draw the bat thinner, compress it and feed it progressively to said bat end supporting bar and feed roll, valve means for closing the passage through said common lint flue at a point between the ends of said by-pass, and means providing a column of clean vehicle air for carrying said cleaned cotton to said condenser.

14. A system for cleaning the aggregate lint cotton put out by a battery of gins, said system including a battery of gins, a condenser serving said gins, and a common lint flue for conducting the lint cotton discharged from said gins to said condenser, means for withdrawing the aggregate cotton from said common lint flue, cleaning it and returning it to said common lint flue, said means comprising a by-pass conduit having dirty cotton and clean cotton limbs communicating with said common lint flue at points between said gins and condenser, a cleaner in said by-pass conduit comprising, within said dirty cotton limb, means for drawing the aggregate cotton and vehicle air from said common lint flue into said dirty cotton limb, means for separating the cotton from said vehicle air including a rotatable horizontal foraminous condenser cylinder having its interior open to atmosphere and the lower peripheral surface thereof exposed to the cotton in said dirty cotton limb forming a transverse baffle across the dirty cotton limb against which the cotton impinges and forms a bat, cleaning means including a rotary saw cylinder, a bat end supporting bar extending longitudinally of said saw cylinder and having a curved lateral face and a flat lower face juxtaposed to the saw cylinder and a feed roll juxtaposed to said curved face in substantially concentric relation therewith defining a bat passage therebetween, said bat end supporting bar and feed roll coacting to compress the bat therebetween and support the bat end while said bat end is being combed by the saw teeth and cause the lint to become fastened to the saw teeth, and means for transferring the batted cotton without vehicle air from said baffle to said cleaning means, valve means for closing the passage through said common lint flue at a point between the ends of said by-pass, and means providing a column of clean vehicle air for carrying said cleaned cotton to said condenser.

15. A system for cleaning the aggregate lint cotton put out by a battery of gins, said system including a battery of gins, a condenser serving said gins, and a common lint flue for conducting the lint cotton discharged from said gins to said condenser, means for withdrawing the aggregate cotton from said common lint flue, cleaning it and returning it to said common lint flue, said means comprising a by-pass conduit having dirty cotton and clean cotton limbs communicating with said common lint flue at points between said gins and condenser, a cleaner in said by-pass conduit comprising, within said dirty cotton limb, means for drawing the aggregate cotton and vehicle air from said common lint flue into said dirty cotton limb, a perforate baffle across said dirty cotton limb against which the cotton impinges and forms a bat, being separated from the vehicle air, which passes through said baffle, cleaning means including a rotary saw cylinder positioned for rotation about a horizontal axis, a feed roll positioned adjacent the periphery of the saw cylinder and journaled for rotation about a horizontal axis, a bat end supporting bar extending longitudinally of said saw cylinder and having a concave curved lateral face confronting and conforming to the lower periphery of the feed roll over a substantial arcuate area of the latter and merging into an upright breast above the center of the feed roll terminating in an upper horizontal corner at the top of the bar, and said bat end supporting bar having a flat lower face juxtaposed to the saw cylinder and a rounded nose between said concave and lower faces, said feed roll and said bat end supporting bar defining a bat passage therebetween and coacting to compress the bat and support the bat end while the bat end is being combed by the saw teeth and cause the lint to become fastened to the saw teeth, and means for transferring the batted cotton without vehicle air from said baffle to said cleaning means including a pair of laterally spaced, substantially horizontal transfer rolls, the adjacent peripheral surface portions of said pair of transfer rolls defining a bat passage therebetween offset laterally in the direction of said feed roll from said breast of said bat end supporting bar and the one of said transfer rolls nearest said bat end supporting bar being positioned to dispose its periphery immediately adjacent said corner of said bat end supporting bar and close to said feed roll whereby a pocket of substantially triangular cross-section is formed between said breast and the ad-

*jacent peripheral surface portions of said feed roll and said one of said transfer rolls, valve means for closing the passage through said common lint flue at a point between the ends of said by-pass, and means providing a column of clean vehicle air for carrying said cleaned cotton to said condenser.*

References Cited in the file of this patent or the original patent

UNITED STATES PATENTS

| | | |
|---|---|---|
| Re. 23,044 | Brooks | Oct. 19, 1948 |
| 1,056,260 | Cheesman | Mar. 18, 1913 |
| 1,063,985 | Lichtenstein et al. | June 10, 1913 |
| 1,729,282 | Corbin | Sept. 24, 1929 |
| 2,100,112 | Taylor | Nov. 23, 1937 |
| 2,128,130 | Farrar | Aug. 23, 1938 |
| 2,258,928 | Graham | Oct. 14, 1941 |
| 2,313,256 | Morgan | Mar. 9, 1943 |
| 2,403,384 | Locke | July 2, 1946 |
| 2,569,501 | Stedronsky et al. | Oct. 2, 1951 |
| 2,576,280 | Brooks | Nov. 27, 1951 |
| 2,639,468 | Streun | May 26, 1953 |
| 2,669,755 | Day | Feb. 23, 1954 |